Dec. 30, 1958   W. HACKEL ET AL   2,866,407
ELECTRIC CONTROL SYSTEM
Filed March 2, 1956   3 Sheets-Sheet 1

Inventor:
WALTER HACKEL
FELIX LENTZE
By Toulmin & Toulmin
Attorneys

*Inventor:*
WALTER HACKEL
FELIX LENTZE
By
*Toulmin & Toulmin*
Attorneys 2,866,407
        ELECTRIC CONTROL SYSTEM Walter Hackel and Felix Lentze, Warstein, Germany, assignors to Licentia Patent-Verwaltungs-G. m. b. H., Hamburg, Germany Application March 2, 1956, Serial No. 569,126

Claims priority, application Germany March 4, 1955

14 Claims. (Cl. 101—181)

This invention relates to an electric control system for correcting the relative positions of a length of moving material such as a paper web or the like, and elements such as the printing rollers in a multi-color printing machine. It relates more particularly to a continuous electric register control system for carrying out continuously corrections of the relative position of the two aforesaid means in multi-color printing apparatus which operate in register with marks being applied by each of the printing elements on the aforesaid moving material.

It is an object of this invention to provide an electric control system in the apparatus described, wherein the correction magnitude applied by the system to the controlled operation is a time interval such as, for instance, the switching-in time of a correcting motor, and/or a corresponding correction length or distance.

It is, therefore, another object of this invention to provide an electric control system which is particularly suitable for cases where the correction magnitude is applied as a correction of length, which correction is made under conditions involving a long starting time of the organ carrying out the correction.

It is a further object of the invention to provide an electric control system for the rectification, for instance, of misregisters in the operation of multicolor printing machines, which system provides improved dynamic conditions for such rectifications, particularly when a long starting time, due to a considerable inertia of the length (or distance) to be corrected, must be taken into consideration.

Web register control systems have been proposed in the art which comprise a correcting motor steered from the misregister, which motor can be switched on to operate in either direction, thereby making it possible to correct the misregister, depending on its having a positive or negative sign, correspondingly causing a left hand or right hand rotation of the motor. The motor carries out a permanent adjustment of the moving web.

The aforesaid objects and advantages are attained by our invention which provides an electric control system for correcting errors such as, for instance, misregisters in multi-color printing machines. The control system comprises an indicia printing element and a control member for checking the indicia on the element. In the event of a misregister, this control member sends out impulses to effect a correction which is greater than the one required to eliminate a misregister.

The control system contains a timing member for the purpose of causing the control member to nullify the excess correction by a correspondingly smaller correction in the reverse sense. The indicia bearing element of the control system according to the invention regulates the excessive correction of the original misregister, as well as the reverse correction of the excess and, consequently, the remaining correction value, depending upon the amount and sign (positive or negative) of the misregister. A preferred embodiment of our invention relates to multi-color printing machines. In this case, the indicia bearing element is the web passing through the machine and the control member can, for instance, be a photoelectric cell or a plurality of such cells.

According to a further feature of the invention, the control member causing the excess correction possesses a correction reversing means which, depending on the direction of the original misregister correction, intervenes with a time lag into the operation of a correcting organ which, in the case of multi-color printing machines, is a specially provided correcting motor. The use of such correcting motors is known in the art and, for instance, described in United States Patent No. 2,230,715, issued February 4, 1941. The correcting organ is switched in, switched off, or reversed by impulses whose magnitude is equal to the difference between the excess correction of the misregister and the reducing correction in reverse direction.

The control system according to the invention also comprises a switching means which actuates the correcting organ, i. e., the motor and possesses two switched in and one "off" position, the "in" positions being dependent on the sign or direction of correction to be made.

The time during which the switch remains in each position depends on the period during which the difference between the misregister and the reverse correction value remains of the same sign (positive or negative). The reverse correction value is characterized by its rate of change with time, i. e. the differential quotient thereof, which differentiated value is coordinated with the position of the switch and reduces the aforesaid difference.

The control system according to the invention is further provided with a second circuit closing means which is controlled by the aforesaid difference value and in turn actuates the above-mentioned switching means.

With this type of control system, according to the invention, it is now possible to achieve a considerable improvement in the dynamics of rectifying misregisters in, for instance, a length of material having great inertia and, therefore, requiring a long starting time for the correcting organ to become effective.

It is furthermore of importance that, according to another feature of our invention, we choose the ratio between the switching-in time and the correction step so high that there would result a considerable excess correction over and beyond the misregister to be corrected, if no provision were made for the reverse correction.

Assuming that the correction is always proportionate to the error, then an error X would cause a correction value Y which is chosen of such magnitude that it will correct the position of the length to be regulated by the amount of $p.X$ wherein $p$ is greater than 1. Preferably, $p$ has a value of 2 to 5.

The subsequently occurring reverse correction will, however, have the effect that the total amount of correction Y only nullifies the real error X and not the artificial major error $p.X$ assuming stationary conditions.

It must furthermore be taken into account that, in regulating lengths of material such as the case in webs of printing machines, misregisters of the value X will hardly ever occur suddenly, but that such errors will accumulate gradually over a considerable period of time.

The control system according to the invention offers the advantage that it is continuously counteracting the accumulation of errors. If an error of major magnitude should nevertheless occur suddenly, the beginning excess correction by the control system according to our invention will quickly eliminate the error, and the mechanism of reverse corrections is adapted to suppress any successive hunting to such an extent that eventually occurring oscillations remain within a range which is practically negligible for being below the limit of "error" having any practical consequences.

The following magnitudes determine the dynamics of the correction step: the velocity of the motor, the gradient of the reverse correction, and an empiric equation for setting the above-mentioned factor $p$ at a value determining the amount of the initial excess correction.

Our invention will be more clearly and fully understood by reference to the following detailed description when taken in conjunction with the accompanying drawings wherein:

Fig. 5a shows a partial view of one of the register checking organs used in the embodiment shown in Figures 5 and 6;

Figure 13:
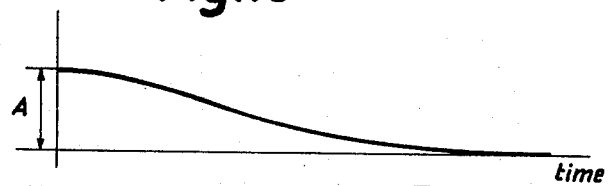
Figure 14:
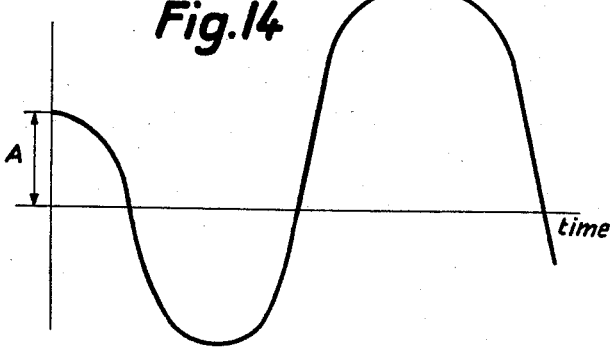

Figs. 13 and 14 show diagrammatically the error in different cases, if no system of the present invention is provided. Referring now to the drawings more in detail and in particular to Fig. 1, reference numeral 1 designates the moving length of material, in this instance, a web in a multi-color printing machine, which web 1 is guided by means of guide rollers around the drying drums 3 and printing rollers 4, 5, 6 and 7 in the direction from left to right in the figure.

Driving means such as a suitable motor 8 drives the composite main driving shaft 9, whose parts are rotated concurrently via the differential gear drives 10, 11, 12 and 13. The driven shafts 14, 15, 16 and 17 transmit power from the drives 10, 11, 12 and 13 and cause the printing rollers 4, 5, 6 and 7, respectively, to rotate.

Connecting motors 18, 19 and 20 are adapted to intervene in the operation of the transmission drives 11, 12 and 13 and accelerate or retard the rotation of shafts 15, 16 or 17 and correspondingly the rotation of the printing rollers 5, 6 or 7 relative to the speed of the differential gear 10 and printing roller 4.

Figure 2:
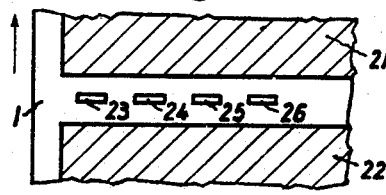
Fig. 2 shows a marginal portion of the web used in the multi-color printing machine shown in Figs. 1 to 4, bearing a number of indicia, each of which is printed on the web by one printing roller of the machine, all of said indicia being aligned to register with each other.

If the images of different color printed on the web 1 by the printing rollers 4, 5, 6 and 7 register with each other, then the register marks printed by each roller respectively are aligned as in Fig. 2.

Fig. 2 shows a marginal portion of the web 1 bearing two multi-color images composed of the superimposed prints of rollers 4, 5, 6 and 7. Simultaneously with printing these images, the roller 4 prints the register mark 23, roller 5 the register mark 24, roller 6 the register mark 25, roller 7 the register mark 26. The arrow in Fig. 2 indicates the direction of travel of the web 1.

Figure 3:
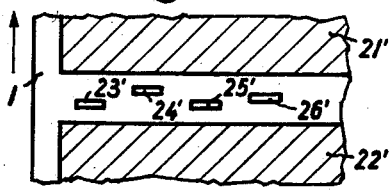
Fig. 3 shows the same marginal portion of the web as in Fig. 2, but with the indicia on the same in misregister.

Fig. 3 illustrates the case that the four images printed by rollers 4, 5, 6 and 7 to form the combined image 21 are not exactly superimposed upon each other but show a slight misregister. In this case, the register marks 23', 24', 25' and 26' are not properly aligned but somewhat transversely displaced out of their common longitudinal axis. In order to correct this misregister of the different color images in image 21', the register marks, for instance, of the rollers 4 and 5 are constantly scanned by a control member 27 which comprises two photo-electric cells 28 and 29, one for each register mark. The impulses from these photo-electric cells are transmitted to a control network 30 in which they are compared with each other, the resultant of both impulses being transmitted from the control network 30 to the correcting organ, i. e. to the correcting motor 18.

In a similar manner, control member 31 scans the pair of register marks 24 and 25 and sends impulses to the control network 32 which, in turn, actuates the correcting motor 19, and the control member 33 compares the marks 25, 26 printed by rollers 6 and 7, respectively, and sends impulses to the control network 34 which, in turn, controls the correcting motor 20.

Figure 4:
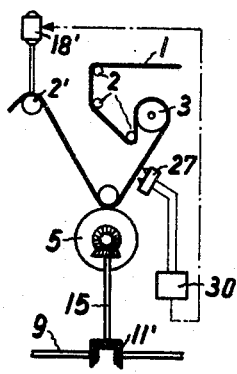
Fig. 4 is a schematic illustration of one printing roll assembly of the multi-color printing machine illustrated in Fig. 1, but provided with another embodiment of the control system according to the invention.

Instead of acting upon the differential drive, which transmits power to the printing roller, the correcting motor in any one of the correcting systems above described may also be arranged to charge the tension of the web and correspondingly counteract an occurring misregister by acting upon the hitch roll. This embodiment is shown in Fig. 4 in which parts identical with those shown in Fig. 1 bear like reference numerals. The control member 27 imparts impulses to the control network 30 which actuates the correcting motor 18' which, in turn changes the speed and/or position of the hitch roll 2'.

Figure 5:
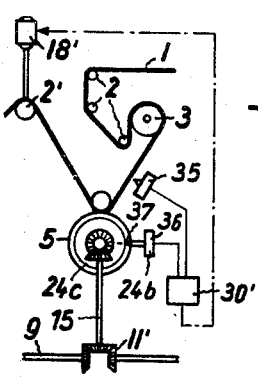
Fig. 5 illustrates yet another embodiment of the control system according to the invention, provided in a printing roll assembly.

A further embodiment of the invention is shown in Figs. 5 and 5a. In this embodiment, the control member 27 (31, 33) is replaced by a control member consisting of two impulse producing members, one of which is a photo-electric cell 35 and the other an impulse generating electro-magnet 36. While the photo-electric cell 35 scans a register mark printed on the web 1 by printing roller 4, electro-magnet 36 scans the rotational movement of an impulse inductor 37 which is mounted on the printing roller 5. The impulses from the two impulse producing members 35 and 36 are transmitted to and compared in the control network 30' which actuates the correcting motor 18'. The latter, in turn, corrects the position or speed of the hitch roll 2'.

Figure 1:
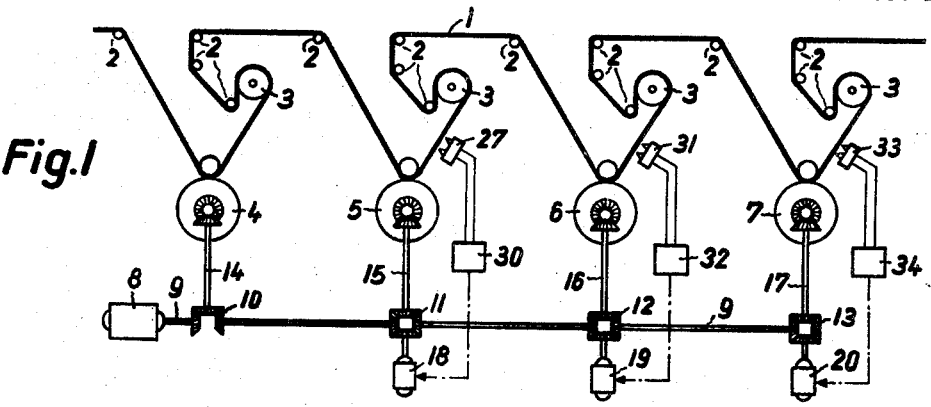
Fig. 1 is a schematic illustration of a multi-color printing machine provided with a control system according to the invention.
Figure 1A:
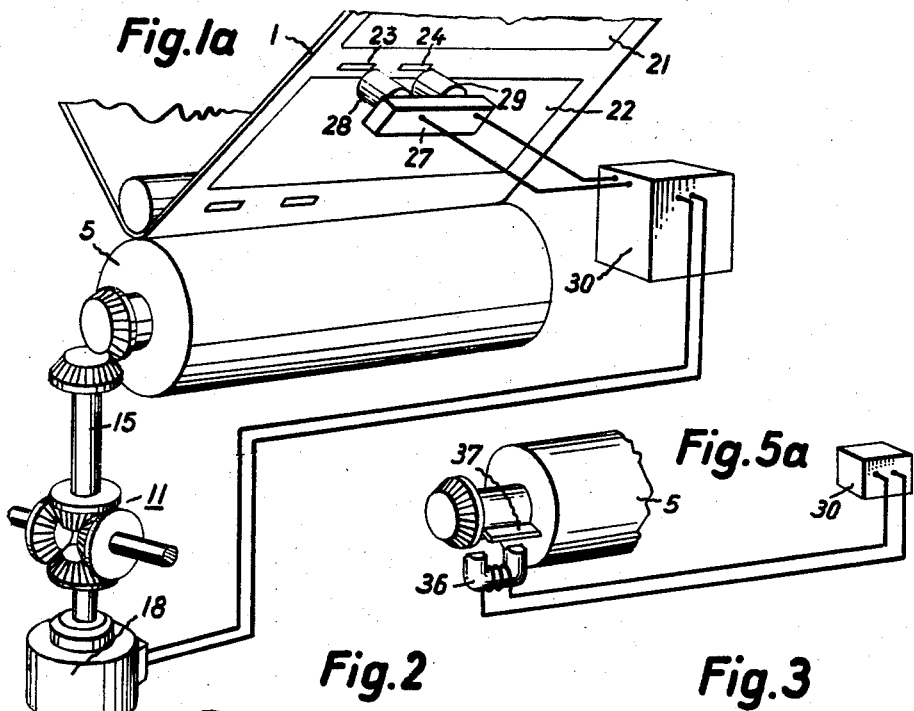
Fig. 1a is a detailed perspective view of the web passing through the multi-color printing machine shown in Fig. 1 with one of the control members.
Figure 6:
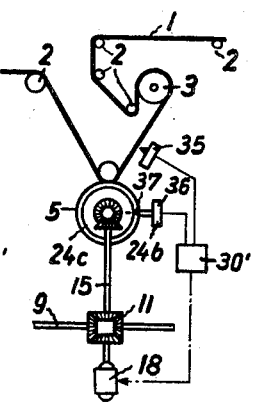
Fig. 6 shows a further embodiment of the control system similar to the one shown in Fig. 1.

According to a further embodiment of the invention shown in Fig. 6, the impulse producing means comprising the photo-electric cell 35 and the electro-magnetic means consisting of the blade 37 and the electro-magnet 36, as well as the control circuit 30', which are all shown in Fig. 5, are combined with the arrangement of the correcting motor 18 of Fig. 1 which acts upon the differential drive 1.

It will be understood that any one of the embodiments shown in Figs. 4, 5 and 6 can be used with any one of the printing rollers 5, 6 and/or 7 in Fig. 1.

Figure 7:
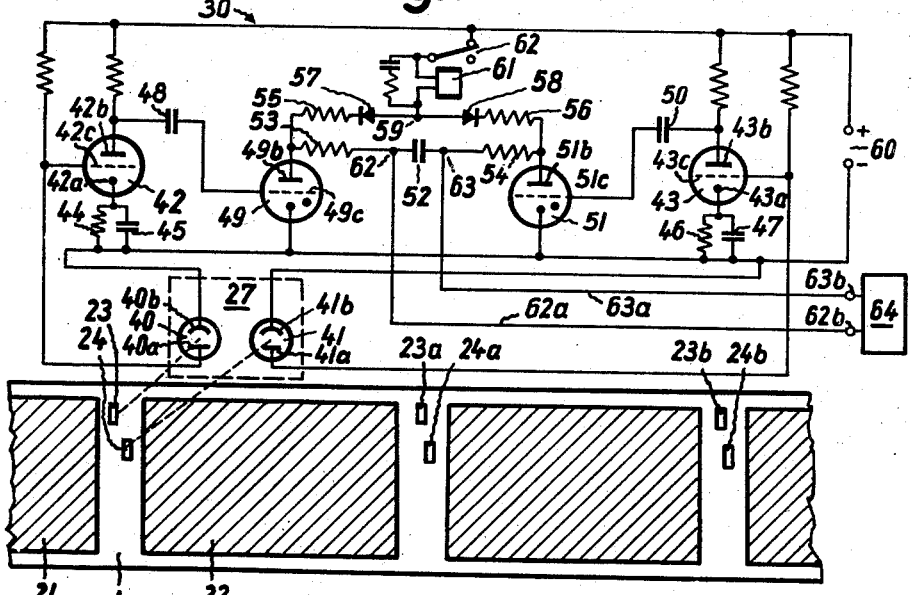
Figs. 7 and 8 show the control system according to the invention in detail.
Figure 8:
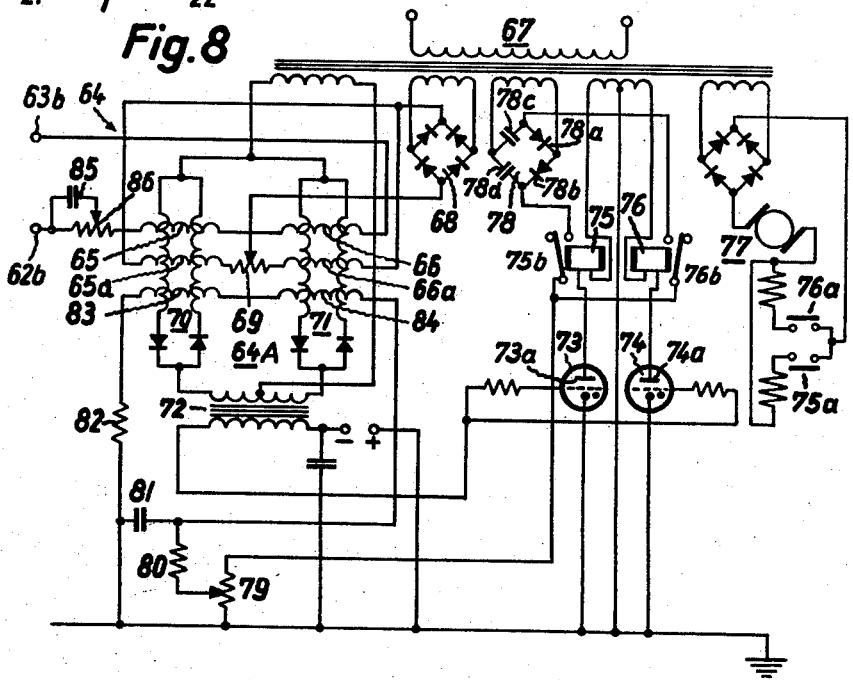

The control network 30 (or 32 or 34) is illustrated in detail in Figs. 7 and 8. Fig. 7 shows again schematically the web 1 bearing the images 21 and 22 and the register marks 23 and 24. In accordance with the embodiment shown in Fig. 1, these marks are scanned by the control member 27 which comprises the photo-electric cells 40 and 41. Each of these photo-electric cells is connected to electronic amplifiers 42 and 43, respectively. The cathode 40a of the photo-electric cell 40 is connected to the control grid 42c of the amplifier tube 42 and the anode 40b of the photo-electric cell is connected via resistor 44 and capacitor 45 to the cathode 42a of amplifier 42. In the same manner, cathode 41a of photo-electric cell 41 is connected to the control grid 43c and anode 41b of the photo-electric cell 41 is connected via resistor 46 and capacitor 47 to cathode 43a of amplifier tube 43. The voltage from anode 42b of amplifier tube 42 is impressed via capacitor 48 on control grid 49c of the thyratron 49, while the anode voltage from anode 43b of amplifier tube 43 is impressed via capacitor 50 on the control grid 51c of thyratron 51. The anodes 49b of thyratron 49 and 51b of thyratron 51 are connected with each other by way of capacitor 52, resistors 53 and 54 being interposed between capacitor 52 and each thyratron, respectively. Anodes 49b and 51b are furthermore connected with each other via the two resistors 55 and 56, which resistors are of equal resistance, and via gates 57 and 58 which are interposed in series with resistors 55 and 56. The anode voltage for the thyratrons 49 and 51 is fed from the positive pole of the direct current source 60 to the balance point 59 of the arrangement of resistor 55, gate 57 and gate 58 and resistor 56 by way of a relay 61 having a contactor means 62 from the connection between anodes 49b and 51b. Lines 62a and 63a lead from points 62 and 63 on either side of capacitor 52 to terminals 62b and 63b in order to supply control impulses to the high ohmic part 64 of the control network.

This part 64 of the control network is shown in Fig. 8 which is described further below. The above-described part of the control system according to the invention functions in the following manner.

If register marks 23 and 24 are correctly aligned, they excite photo-electric cells 40 and 41 simultaneously, consequently thyratrons 49 and 51 are activated concurrently, and the respective currents flow through resistors 55 and 56 during exactly the same time interval until the time relay 62 has opened contactor 62. By opening this contactor, the entire arrangement is ready for the scanning of the next following pair of register marks.

If, however, there is a misregister between these marks, as for instance, indicated by the positions 23a and 24a, whereby mark 23a influences photo-electric cell 40 a little prior to mark 24a influencing cell 41, an impulse is transmitted from cell 40 to amplifier 42 a little earlier than cell 41 transmits an impulse to amplifier 43. Consequently, the thyratron 49 is activated by exactly the same time interval earlier than thyratron 51. During this time interval, an anode current is therefore flowing through the resistor 55, while no current flows through the resistor 56. Thereby a voltage potential is generated which is charged on to the capacitor 52. This charging of the capacitor 52 is terminated at the moment thyratron 51 is also ignited.

Since the scanning of the register marks is periodic, as marks 23, 24, then 23a, 24a, and thereafter 23b, 24b move past the photo-electric cells 40 and 41, an equilibrium is established between the charging of capacitor 52 and its discharge by way of lines 62a and 63a toward the high ohmic part 64 of the control system. In accordance with this equilibrium, the average current in part 64 of the control network is proportional to the time difference between the impulses caused by the two register marks in misregister.

On the other hand, if the register marks misregister in the manner illustrated at 23b and 24b, mark 24b will excite the photo-electric cell 41 prior to the cell 40 being excited by mark 23b. Consequently, thyratron 51 is ignited before thyratron 49, and during the time interval between the activations of the two thyratrons, a current flows only through resistor 56, but not through resistor 55, so that the capacitor 52 receives a charge of opposite polarity to that received in the instance of a misregister as of marks 23a and 24a. The discharge current flowing from the capacitor 52 to the part 64 of the control system flows, therefore, in opposite direction to the current flowing in the instance of the misregister marks 23a and 24a. In either case, the current supplied to the terminals 62b and 63b is proportionate in magnitude to the amount of misregister detected by the control member 27.

Proceeding now with the description of part 64 of the control network as illustrated in Fig. 8, current from capacitor 52 is applied, through terminals 62b and 63b, to the polarization coils 65 and 66 of a push-pull magnetic amplifier 64A. This amplifier 64A comprises further the coils 65a and 66a which are supplied with direct current from an auxiliary voltage source 67 via a rectifier 68 and a potentiometer 69. In the embodiment shown in Fig. 8, the rectifier 68 is a constant voltage bridge rectifier. These coils 65a and 66a serve the purpose of obtaining a constant pre-excitation and, furthermore, for balancing the two amplifier parts 70 and 71 to zero. The current through the coils 65 and 66 has for example a value of 40 μA if the error has a value of 1 mm.

The magnetic amplifier 64A controls the voltage which is fed to a transformer 72 which is preferably a peaking transformer of the magnetic core type. The secondary of the transformer supplies phase dependent igniting impulses to the two gas-filled discharge tubes 73 and 74. These tubes are connected in the same manner as full wave rectifiers to the auxiliary voltage source 67 so that only one of them is ignited in case they are driven synchronously with the power supply. The anodes 73a and 74a of the discharge tubes 73 and 74 are connected to relays 75 and 76, either of which closes a contactor 75a or 76a if its respective discharge tube is ignited. Thereby the motor 77 is accelerated either in one direction or the other. The motor has a speed of preferably 0.2 to 0.5 mm./sec.

The presently described portion of the part of the control system illustrated in Fig. 8 operates in the following manner. If a current amounting to zero flows through the coils 65 and 66, a total voltage potential equal to zero exists in the primary of the transformer due to the polarization from the constant voltage source 68. Consequently, no voltage potential is generated in the secondary of the transformer 72, and the discharge tubes 73 and 74 are not activated so that neither the relay 75 nor the relay 76 is excited.

If, on the other hand, a current is flowing in a determined direction through the polarization coils 65 and 66, this is, in the first place, an indication that a misregister has occurred on the web 1. The equilibrium in the primary of the transformer 72 is thus disturbed because the excitation of the two magnetic amplifiers 70 and 71 is unsymmetrical. Depending on the direction of flow of the current through the polarization coils 65 and 66, an ignition impulse is generated in the secondary of the transformer 72, which impulse is of such position of phase that either tube 73 or tube 74 is ignited. The relay excited in either case closes contactor 75a or 75b, and the motor 77 is energized to run in one or the other direction. This motor 77 serves to reduce and eliminate the error which is the original cause for the flow of current through coils 65 and 66.

Referring further to the part of the control network illustrated in Fig. 8, a constant voltage source 78 which comprises two gates 78a and 78b and two capacitors 78c and 78d supplies a substantially smoothed constant voltage.

The relays 75 and 76 further actuate contactors 75b and 76b which, when closed, connect the constant voltage source 78 via a potentiometer 79 and a resistor 80 to the charging plate of the capacitor 81. The discharge current from this capacitor 81 is conducted to flow through a resistor 82 and successively arranged coils 83 and 84 which form part of the magnetic amplifier 64A. This return circuit is provided common for both directions of current flow, as described above.

If the discharge tube 73 excited the relay 75 and causes the same to close contactors 75a and 75b, the motor 77 is excited to run in a determined sense of rotation, either clockwise or counterclockwise, as the case may be. Simultaneously, the constant voltage source 78 is connected, through closing of the contactor 75b, to the capacitor 81 by way of the potentiometer 79 and resistor 80 and charges the capacitor. Thereby a voltage potential is built up in the return circuit formed by the resistor 82 and the coils 83 and 84, which return current increases approximately proportionally with time and causes a corresponding current to flow through this circuit. This current also increases in proportion to time. This return current generates a flow in the magnetic amplifier 64A in a direction opposed to the misregister current flowing through coils 62 and 63. The total flow in each of the two branches of the magnetic amplifier 64A, which branches are formed by the coils 65 and 83 and by the coils 66 and 84 is reduced to zero more rapidly owing to the effect of the opposing return current and thus seems to indicate that the misregister has disappeared at a time when this is not yet the case. As soon as the aforesaid total flow is zero, the driving voltage for the discharge tube 73 disappears and the contactors 75a and 75b open. Thereby the energization of motor 77 is interrupted and the capacitor 81 is no longer charged. If the resistor 82 is high ohmic, preferably in the range of 50,000 ohms to 100,000 ohms, and capacitor 81 has a preferable value of 30μ to 50μ F., a discharge current will begin to flow slowly. Since, however, the current flow through resistors 65 and 66 decreases somewhat more rapidly than the discharge current, there results in the branches 70 and 71 of the magnetic amplifier 64A a total flow which simulates a misregister in opposite direction so that discharge tube 74 is ignified. This causes the relay 76 to be excited and to close the contactors 76a and 76b, thereby energizing the motor 77 to run in the opposite sense. While the capacitor 81 has been charged to a determined polarity, when contactor 75b was closed, an opposed constant voltage is now applied to the same side of the capacitor 81 via potentiometer 79 and resistor 80 due to the closing of contactor 76b. This reduces the driving potential for the feedback circuit consisting of elements 82, 83 and 84 and eventually its sign may be inverted. In the meantime, motor 77 runs in such sense of rotation that it causes a correction of the misregister to be made by a corresponding adjustment of the position or speed of the web 1, which adjustment tends to build up a misregister of the same sign as the one existing originally. The decrease of the misregister current through coils 65 and 66 is thereby in turn reduced and the total flow in the amplifier 64A passes again through zero, thereby extinguishing discharge tube 74 and re-igniting discharge tube 73. By providing a motor 77 of such power that the correcting stroke due to the first energization of the motor would cause an excess correction of a given misregister, if no further measures of the kind described were taken, it is possible to tune the entire control system in such a manner that the occurring error is rapidly reduced to zero, even if the length of material, i. e. the web on which the correction is to be effected, is of great inertia. The alternating effects of excess correction and reverse correction which lead to a corresponding energization of the corecting motor alternatingly in clockwise and counterclockwise rotation leads to a gradual attenuation of the alternating energizations of the motor, whereby the error in either direction is limited in the vicinity of zero.

An additional differentiating influence can be obtained by providing a capacitor 85 and potentiometer 86 in the input line from terminal 62a to the coil 65.

Figure 9:
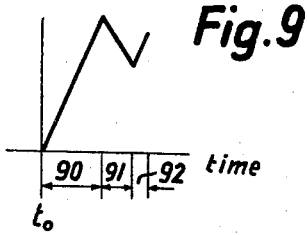
Fig. 9 shows diagrammatically the way of the correcting motor.

Fig. 9 shows the way of the correcting motor 77. During the time intervals 90 and 92 the motor runs in one direction, and during the time interval 91 the motor runs in the opposite sense.

Figure 10:
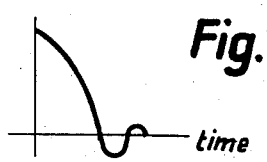
Figs. 10–12 show diagrammatically currents and voltages within the control network.

Fig. 10 shows the voltage in the secondary of the transformer 72.

Figure 11:
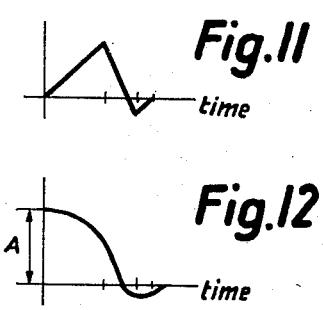

Fig. 11 shows the voltage of the capacitor 81 during the same time intervals 90—92. The rate of change with time during the time intervals 90 and 92 has for example positive sign, and during the time intervals its differential quotient is negative.

Figure 12:

Fig. 12 shows the current through the coils 65 and 66. This current is proportional to the error. Figs. 9–12 therefore show the important currents and voltages within the regulation network, if the error has in the time to a value A.

Fig. 13 shows the error, if $p$ has the value 1.

Fig. 14 shows the error, if for example $p$ has a value greater than 1, but no reverse correction is provided. Therefore Fig. 12 shows the advantage of the invention, because the error is very quickly corrected.

This invention is described by us as embodied in one preferred example, with the aid of which the principle of the invention has been explained, together with the best method in which we presently contemplate applying that principle. However, it will be understood that the elements and networks shown are merely illustrative and that the invention is not limited thereto, but that it is susceptible to modification in order to adapt it to various conditions and uses and that it is desired to comprehend such modifications within this invention as may fall within the scope of the appended claims.

We claim:

1. An electric control system for correcting misregister of the superimposed images of different color printed on a web by a plurality of printing rollers in a multicolor printing machine, said system comprising one impulse inducing means for each printing roller, at least one of said impulse inducing means being adapted for printing a succession of register indicia on said web; means for detecting the sign and amount of a misregister between the images printed by two of said printing rollers by scanning, and responding to the action of two of said impulse inducing means, electric energizing means responsive to said misregister detecting means depending on the sign and amount of said misregister, correcting means energizable by said energizing means and adapted to correct said misregister detected by said detecting means, said energizing means energizing said correcting means to make a first correction in excess of the amount and of opposite sign to the sign of said misregister, and electric delayed action means energizable by return currents in said electric energizing means in proportion to time and effecting, when energized, a second correction directed in the opposite sense to said first correction, said first and second corrections being functions of the sign and amount of said misregister.

2. An electric control system for correcting misregister of the superimposed images of different color printed on a web by a plurality of printing rollers in a multicolor printing machine, said system comprising a first impulse inducing means on one of said printing rollers printing a succession of register indicia on said web; means for detecting the sign and amount of a misregister between the images printed by two of said printing rollers which means comprise (a) a photo-electric cell responsive to said indicia on said web and producing a first impudse; (b) a second impulse inducing means synchronously rotatably connected with the other printing rollers (c) an impulse sending means responsive to said impulse inducing means so as to produce a second impulse; and (d) means for comparing said first and second impulses to detect a time interval therebetween; electric energizing means responsive to said misregister detecting means depending on the sign and amount of said misregister, correcting means energizable by said energizing means and adapted to correct said misregister detected by said detecting means, said energizing means energizing said correcting means to make a first correction in excess of the amount and of opposite sign to the sign of said misregister, and electric delayed action means energizable by return currents in said electric energizing means in proportion to time and effecting, when energized, a second correction directed in the opposite sense to said first correction, said first and second corrections being functions of the sign and amount of said misregister.

3. An electric control system for correcting misregister of the superimposed images of different color printed on a web by a plurality of printing rollers in a multi-color printing machine, said system comprising means on each of said printing rollers printing a succession of register indicia on said web; means for detecting the sign and amount of a misregister between the images printed by two of said printing rollers which consist of a pair of photo-electric cells responsive to a pair of indicia on said web, each of said cells producing an impulse, and means for comparing said impulses to detect a time interval therebetween; electric energizing means responsive to said misregister detecting means depending on the sign and amount of said misregister, correcting means energizable by said energizing means and adapted to correct said misregister detected by said detecting means, said energizing means energizing said correcting means to make a first correction in excess of the amount and of opposite sign to the sign of said misregister, and electric delayed action means energizable by return currents in said electric energizing means in proportion to time for effecting, when energized, a second correction directed in the opposite sense to said first correction, said first and second corrections being functions of the sign and amount of said misregister.

4. An electric control system for correcting misregister of the superimposed images of different color printed on a web by a plurality of printing rollers in a multi-color printing machine, said system comprising a plurality of impulse inducing means comprising means on at least one of said printing rollers printing a succession of register indicia on said web; means for detecting the sign and amount of a misregister between the images printed by two of said printing rollers by scanning, and responding to the action of, two of said impulse producing means, electric energizing means responsive to said misregister detecting means depending on the sign and amount of said misregister, correcting means energizable by said energizing means and adapted to correct said misregister detected by said detecting means, said energizing means energizing said correcting means to make a first correction in excess of the amount and of opposite sign to the sign of said misregister, and electric delayed action means energizable by return currents in said electric energizing means in proportion to time and effecting when energized, a second correction directed in the opposite sense to said first correction, said first and second corrections being functions of the sign and amount of said misregister, and switching means responsive to the difference between said misregister and said second correction, which switching means is adapted for switching said correcting means on and off, and reverse the sense of rotation of the same.

5. An electric control system for correcting misregister of the superimposed images of different color printed on a web by a plurality of printing rollers in a multi-color printing machine, said system comprising a first impulse inducing means on one of said printing rollers printing a succession of register indicia on said web; means for detecting the sign and amount of a misregister between the images printed by two of said printing rollers which means comprise (a) a photo-electric cell responsive to said indicia on said web and producing a first impulse, (b) a second impulse inducing means synchronously rotatably connected with the other printing rollers, (c) an impulse sending means responsive to said impulse inducing means so as to produce a second impulse; and (d) an impulse comparing network comprising a pair of thyratrons, control grid means in each of said thyratrons for receiving said first and second impulses thereon; anode means in each of said thryratrons, said anode means being connected with each other, a capacitor interposed between said anode means, a first and second resistor of equal resistance interposed in series between said anode means, said first and second resistors being connected in parallel with said capacitor, a line connected intermediate said first and second resistors for supplying anode voltage to said anode means, and electric delayed action means comprising relay means for a delayed interruption of the anode current to said anodes, electric energizing means responsive to the voltage from said capacitor depending on the sign and amount of said misregister, correcting means energizable by said energizing means and adapted to correct said misregister detected by said detecting means, said energizing means energizing said correcting means to make a first correction in excess of the amount and of opposite sign to the sign of said misregister; said electric delayed action means being energizable by return currents in said electric energizing means in proportion to time and effecting, when energized, a second correction directed in the opposite sense to said first correction, said first and second corrections being functions of the sign and amount of said misregister.

6. An electric control system for correcting misregister of the superimposed images of different color printed on a web by a plurality of printing rollers in a multi-color printing machine, said system comprising means on each of said printing rollers printing a succession of register indicia on said web; means for detecting the sign and amount of a misregister between the images printed by two of said printing rollers which consist of a pair of photo-electric cells responsive to a pair of indicia on said web, each of said cells producing an impulse; and an impulse comparing network comprising a pair of thyratrons, control grid means in each of said thyratrons for receiving said first and second impulses thereon; anode means in each of said thyratrons, said anode means being connected with each other, a capacitor interposed between said anode means, a first and second resistor of equal resistance interposed in series between said anode means, said first and second resistors being connected in parallel with said capacitor, a line connected intermediate said first and second resistors for supplying anode voltage to said anode means, and electric delayed action means comprising relay means for a delayed interruption of the anode current to said anodes, electric energizing means responsive to the voltage of the capacitor depending on the sign and amount of said misregister, correcting means energizable by said energizing means and adapted to correct said misregister detected by said detecting means, said energizing means energizing said correcting means to make a first correction in excess of the amount and of opposite sign to the sign of said misregister; said electric delayed action means being energizable by return currents in said electric energizing means in proportion to time and effecting, when energized, a second correction directed in the opposite sense to said first correction, said first and second corrections being functions of the sign and amount of said misregister.

7. An electric control system for correcting misregister of the superimposed images of different color printed on a web by a plurality of printing rollers in a multi-color printing machine, said system comprising means on each of said printing rollers printing a succession of register indicia on said web; means for detecting the sign and amount of a misregister between the images printed by two of said printing rollers and producing two impulses each of which corresponds to the position of one of said images; and an impulse comparing network comprising a pair of thyratrons, control grid means in each of said thyratrons for receiving said first and second impulses thereon; anode means in each of said thyratrons, said anode means being connected with each other, a capacitor interposed between said anode means, a first and second resistor of equal resistance interposed in series between said anode means, said first and second resistors being connected in parallel with said capacitor, a line connected intermediate said first and second resistors for supplying anode voltage to said anode means, and electric delayed action means comprising relay means for a delayed interruption of the anode current to said anodes, electric energizing means responsive to the voltage of the capacitor depending on the sign and amount of said misregister, correcting means energizable by said energizing means and adapted to correct said misregister detected by said detecting means, said energizing means energizing said correcting means to make a first correction in excess of the amount and of opposite sign to the sign of said misregister; said electric delayed action means being energizable by return currents in said electric energizing means in proportion to time and effecting, when energized, a second correction directed in the opposite sense to said first correction, said first and second corrections being functions of the sign and amount of said misregister.

8. An electric control system for correcting misregister of the superimposed images of different color printed on a web by a plurality of printing rollers in a multicolor printing machine, said system comprising means on each of said printing rollers printing a succession of register indicia on said web; means for detecting the sign and amount of a misregister between the images printed by two of said printing rollers and producing two impulses each of which corresponds to the position of one of said images; and an impulse comparing network comprising a pair of thyratrons, control grid means in each of said thyratrons for receiving said first and second impulses thereon; anode means in each of said thyratrons, said anode means being connected with each other, a capacitor interposed between said anode means, a chain of elements consisting of a first resistor, a first rectifier, a second rectifier, and a second resistor of the same resistance as said first resistor interposed in series between said anode means, said first and second resistors being connected in parallel with said capacitor, a line connected intermediate said first and second resistors for supplying anode voltage to said anode means, and electric delayed action means comprising relay means for a delayed interruption of the anode current to said anodes, electric energizing means responsive to the voltage of the capacitor depending on the sign and amount of said misregister, correcting means energizable by said energizing means and adapted to correct said misregister detected by said detecting means, said energizing means energizing said correcting means to make a first correction in excess of the amount and of opposite sign to the sign of said misregister; said electric delayed action means being energizable by return currents in said electric energizing means in proportion to time and effecting, when energized, a second correction directed in the opposite sense to said first correction, said first and second corrections being functions of the sign and amount of said misregister.

9. An electric control system for correcting misregister of the superimposed images of different color printed on a web by a plurality of printing rollers in a multi-color printing machine, said system comprising means on each of said printing rollers printing a succession of register indicia on said web; means for detecting the sign and amount of a misregister between the images printed by two of said printing rollers and producing two impulses each of which corresponds to the position of one of said images; and an impulse comparing network comprising a pair of thyratrons, control grid means in each of said thyratrons for receiving said first and second impulses thereon; anode means in each of said thyratrons, said anode means being connected with each other, a capacitor interposed between said anode means, a first and second resistor of equal resistance interposed in series between said anode means, said first and second resistors being connected in parallel with said capacitor, a line connected intermediate said first and second resistors for supplying anode voltage to said anode means, and electric delayed action means comprising a timing relay for a delayed interruption of the anode current to said anodes, electric energizing means responsive to the voltage of the capacitor depending on the sign and amount of said misregister, correcting means energizable by said energizing means and adapted to correct said misregister detected by said detecting means, said energizing means energizing said correcting means to make a first correction in excess of the amount and of opposite sign to the sign of said misregister; said electric delayed action means being energizable by return currents in said electric energizing means in proportion to time and effecting, when energized, a second correction directed in the opposite sense to said first correction, said first and second corrections being functions of the sign and amount of said misregister.

10. An electric control system for correcting misregister of the superimposed images of different color printed on a web by a plurality of printing rollers in a multi-color printing machine, said system comprising means on each of said printing rollers printing a succession of register indicia on said web; means for detecting the sign and amount of a misregister between the images printed by two of said printing rollers and producing two impulses each of which corresponds to the position of one of said images; and an impulse comparing network comprising a pair of thyratrons, control grid means in each of said thyratrons for receiving said first and second impulses thereon; anode means in each of said thyratrons, said anode means being connected with each other, a capacitor interposed between said anode means, a first and second resistor of equal resistance interposed in series between said anode means, said first and second resistors being connected intermediate said first and second resistors for supplying anode voltage to said anode means, and electric delayed action means comprising relay means for a delayed interruption of the anode current to said anodes, electric energizing means responsive to the voltage of the capacitor depending on the sign and amount of said misregister, correcting means energizable by said energizing means and adapted to correct said misregister detected by said detecting means, said energizing means energizing said correcting means to make a first correction in excess of the amount and of opposite sign to the sign of said misregister; said electric delayed action means being energizable by return currents in said electric energizing means in proportion to time and effecting, when energized, a second correction directed in the opposite sense to said first correction, said first and second corrections being functions of the sign and amount of said misregister wherein an increase of said second correction proportionate to the difference between misregister and second correction changes the sign of the latter.

11. An electric control system for correcting misregister of the superimposed images of different color printed on a web by a plurality of printing rollers in a multi-color printing machine, said system comprising means on each of said printing rollers printing a succession of register indicia on said web; means for detecting the sign and amount of a misregister between the images printed by two of said printing rollers and producing two impulses each of which corresponds to the position of one of said images; and an impulse comparing network comprising a pair of thyratrons, control grid means in each of said thyratrons for receiving said first and second impulses thereon; anode means in each of said thyratrons, said anode means being connected with each other, a capacitor interposed between said anode means, a first and second resistor of equal resistance interposed in series between said anode means, said first and second resistors being connected in parallel with said capacitor, a line connected intermediate said first and second resistors for supplying anode voltage to said anode means, and electric delayed action means comprising relay means for a delayed interruption of the anode current to said anodes, electric energizing means comprising a magnetic amplifier circuit adapted for pre-excitation of said circuit depending on the sign and amount of said misregister, said amplifier circuit being adapted for producing a secondary reverse exciting voltage proportionate with time, the polarity of said reverse exciting voltage being inverted if the sign of the sum of both said pre-excitation and said secondary exciting voltage is reversed responsive to the voltage of the capacitor depending on the sign and amount of said misregister, correcting means energizable by said energizing means and adapted to correct said misregister detected by said detecting means, said energizing means energizing said correcting means to make a first correction in excess of the amount and of opposite sign to the sign of said misregister; said electric delayed action means being energizable by return currents in said electric energizing means in proportion to time and effecting, when energized, a second correction directed in the opposite sense to said first correction, said first and second corrections being functions of the sign and amount of said misregister.

12. An electric control system for correcting misregister of the superimposed images of different color printed on a web by a plurality of printing rollers in a multi-color printing machine, said system comprising means on each of said printing rollers printing a succession of register indicia on said web; means for detecting the sign and amount of a misregister between the images printed by two of said printing rollers and producing two impulses each of which corresponds to the position of one of said images; and an impulse comparing network comprising a pair of thyratrons, control grid means in each of said thyratrons for receiving said first and second impulses thereon; anode means in each of said thyratrons, said anode means being connected with each other, a capacitor interposed between said anode means, a first and second resistor of equal resistance interposed in series between said anode means, said first and second resistors being connected in parallel with said capacitor, a line connected intermediate said first and second resistors for supplying anode voltage to said anode means, and electric delayed action means comprising relay means for a delayed interruption of the anode current to said anodes, electric energizing means comprising a magnetic amplifier circuit adapted for pre-excitation of said circuit depending on the sign and amount of said misregister, said amplifier circuit being adapted for producing a secondary reverse exciting voltage proportionate with time, the polarity of said reverse exciting voltage being inverted if the sign of the sum of both said pre-excitation and said secondary exciting voltage is reversed responsive to the voltage of the capacitor depending on the sign and amount of said misregister, correcting means energizable by said energizing means and adapted to correct said misregister detected by said detecting means, said energizing means energizing said correcting means to make a first correction in excess of the amount and of opposite sign to the sign of said misregister; said electric delayed action means being energizable by return currents in said electric energizing means in proportion to time and effecting, when energized, a second correction directed in the opposite sense to said first correction, said first and second corrections being functions of the sign and amount of said misregister wherein an increase of said second correction proportionate to the difference between misregister and second correction changes the sign of the latter.

13. An electric control system for correcting misregister of the superimposed images of different color printed on a web by a plurality of printing rollers in a multi-color printing machine, said system comprising means on each of said printing rollers printing a succession of register indicia on said web; means for detecting the sign and amount of a misregister between the images printed by two of said printing rollers and producing two impulses each of which corresponds to the position of one of said images; and an impulse comparing network comprising a pair of thyratrons, control grid means in each of said thyratrons for receiving said first and second impulses thereon; anode means in each of said thyratrons, said anode means being connected with each other, a capacitor interposed between said anode means, a first and second resistor of equal resistance interposed in series between said anode means, said first and second resistors being connected in parallel with said capacitor, a line connected intermediate said first and second resistors for supplying anode voltage to said anode means, and electric delayed action means comprising relay means for a delayed interruption of the anode current to said anodes, electric energizing means comprising a magnetic amplifier circuit adapted for pre-excitation of said circuit depending on the sign and amount of said misregister, said amplifier circuit being adapted for producing a secondary reverse exciting voltage proportionate with time, the polarity of said reverse exciting voltage being inverted if the sign of the sum of both said pre-excitation and said secondary exciting voltage is reversed responsive to the voltage of the capacitor depending on the sign and amount of said misregister, said pre-excitation of said amplifier circuit being effected by the discharge current from said capacitor; correcting means energizable by said energizing means and adapted to correct said misregister detected by said detecting means, said energizing means energizing said correcting means to make a first correction in excess of the amount and of opposite sign to the sign of said misregister; said electric delayed action means being energizable by return currents in said electric energizing means in proportion to time and effecting, when energized, a second correction directed in the opposite sense to said first correction, said first and second corrections being functions of the sign and amount of said misregister wherein an increase of said second correction proportionate to the difference between misregister and second correction changes the sign of the latter.

14. An electric control system as described in claim 13, wherein a potentiometer capacitor circuit is interposed between said capacitor means and said magnetic amplifier circuit.

References Cited in the file of this patent
UNITED STATES PATENTS

| | | |
|---|---|---|
| 2,497,909 | Poole | Feb. 21, 1950 |
| 2,583,580 | Ludwig | Jan. 29, 1952 |